US012664903B2

(12) United States Patent (10) Patent No.: US 12,664,903 B2
Flasar et al. (45) Date of Patent: Jun. 23, 2026

(54) VEHICLE TRAFFIC ALERT IDENTIFICATION SYSTEM

(71) Applicant: Honeywell International Inc., Charlotte, NC (US)

(72) Inventors: Jan Flasar, Prague (CZ); Martin Puskar, Prague (CZ); Tomas Kralicek, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 229 days.

(21) Appl. No.: 18/485,008

(22) Filed: Oct. 11, 2023

(65) Prior Publication Data

US 2025/0022381 A1 Jan. 16, 2025

Related U.S. Application Data

(60) Provisional application No. 63/509,670, filed on Jun. 22, 2023.

(51) Int. Cl.
*G08G 5/72* (2025.01)
*G08G 5/21* (2025.01)
(Continued)

(52) U.S. Cl.
CPC ............... *G08G 5/723* (2025.01); *G08G 5/21* (2025.01); *G08G 5/80* (2025.01); *H04W 4/029* (2018.02); *H04W 4/42* (2018.02)

(58) Field of Classification Search
CPC ............ G08G 5/723; G08G 5/21; G08G 5/80; H04W 4/029; H04W 4/42
See application file for complete search history.

(56) References Cited

U.S. PATENT DOCUMENTS

| 7,962,279 | B2 * | 6/2011 | Pepitone | ................ | G08G 5/723 |
| | | | | | 340/961 |
| 8,019,529 | B1 * | 9/2011 | Sharma | .................... | G08G 5/51 |
| | | | | | 701/117 |

(Continued)

FOREIGN PATENT DOCUMENTS

| WO | 2002071367 A1 | 9/2002 |
| WO | 2006101763 A1 | 9/2006 |

OTHER PUBLICATIONS

Extended Search Report from counterpart European Application No. 24180438.4 dated Dec. 2, 2024, 14 pp.

(Continued)

*Primary Examiner* — Dale W Hilgendorf
(74) *Attorney, Agent, or Firm* — Shumaker & Sieffert, P.A.

(57) ABSTRACT

A system comprising: communications circuitry; a user interface (UI); and processing circuitry disposed within an ownship vehicle, the processing circuitry being configured to: receive, via the communications circuitry, one or more first locations of an ownship vehicle; receive, via the communications circuitry, one or more second locations of a second vehicle; determine, based at least in part on the one or more first locations and the one or more second locations, whether the second vehicle satisfies a threshold condition; in response to determining that the second vehicle satisfies the threshold condition, cause the UI to output an alert corresponding to the second vehicle; and in response to determining that the second vehicle does not satisfy the threshold condition, cause the UI to not output the alert.

18 Claims, 5 Drawing Sheets

(51) Int. Cl.
  *G08G 5/80* (2025.01)
  *H04W 4/029* (2018.01)
  *H04W 4/42* (2018.01)

(56) References Cited

U.S. PATENT DOCUMENTS

| | | | | |
|---|---|---|---|---|
| 8,629,800 | B2* | 1/2014 | Anderson | B64F 1/3055 |
| | | | | 367/909 |
| 8,638,240 | B2* | 1/2014 | Glover | G08G 5/723 |
| | | | | 340/972 |
| 9,533,617 | B2* | 1/2017 | Van Steenkist | B60Q 9/008 |
| 9,547,993 | B2 | 1/2017 | Khatwa et al. | |
| 9,881,508 | B2* | 1/2018 | Silver | G01S 13/933 |
| 10,269,252 | B2 | 4/2019 | Greene | |
| 10,388,173 | B2* | 8/2019 | Durand | G08G 5/80 |
| 10,643,481 | B2* | 5/2020 | Salesse-Lavergne | G08G 5/74 |
| 11,495,134 | B2* | 11/2022 | Liu | G01S 15/93 |
| 2005/0007257 | A1* | 1/2005 | Rast | B64D 47/04 |
| | | | | 340/815.45 |
| 2006/0214816 | A1* | 9/2006 | Schell | G08G 5/51 |
| | | | | 340/961 |
| 2010/0017105 | A1* | 1/2010 | Pepitone | G08G 5/80 |
| | | | | 701/120 |
| 2011/0071750 | A1* | 3/2011 | Giovino | G08G 5/51 |
| | | | | 701/120 |
| 2011/0087417 | A1* | 4/2011 | Anderson | B60Q 5/006 |
| | | | | 701/96 |
| 2012/0200433 | A1* | 8/2012 | Glover | G08G 5/21 |
| | | | | 340/971 |
| 2013/0321176 | A1* | 12/2013 | Vasek | G08G 5/21 |
| | | | | 340/945 |
| 2013/0345906 | A1* | 12/2013 | Kabrt | G08G 5/25 |
| | | | | 701/3 |
| 2014/0062756 | A1* | 3/2014 | Lamkin | G08G 5/51 |
| | | | | 342/29 |
| 2014/0309916 | A1* | 10/2014 | Bushnell | G01C 23/005 |
| | | | | 701/122 |
| 2015/0170525 | A1* | 6/2015 | Conner | G08G 5/70 |
| | | | | 701/3 |
| 2016/0171898 | A1* | 6/2016 | Silver | G08G 5/21 |
| | | | | 701/3 |
| 2016/0247406 | A1* | 8/2016 | Khatwa | G05D 1/0833 |
| 2018/0301045 | A1* | 10/2018 | Pesik | G08G 5/21 |
| 2021/0150922 | A1* | 5/2021 | Kanagarajan | G08G 5/22 |
| 2021/0241637 | A1* | 8/2021 | Panchangam | G08G 5/25 |
| 2021/0350715 | A1* | 11/2021 | Liu | G01S 15/93 |
| 2024/0242618 | A1* | 7/2024 | Osipychev | G08G 5/21 |

OTHER PUBLICATIONS

Response to Extended Search Report dated Dec. 2, 2024, from counterpart European Application No. 24180438.4 filed Jun. 27, 2025, 45 pp.

* cited by examiner

VEHICLE TRAFFIC ALERT IDENTIFICATION SYSTEM

This application claims the benefit of U.S. Provisional Patent Application No. 63/509,670 filed Jun. 22, 2023 and entitled "VEHICLE TRAFFIC ALERT IDENTIFICATION SYSTEM," the entire contents of which is incorporated herein by reference.

TECHNICAL FIELD

This disclosure relates to collision prevention for vehicles.

BACKGROUND

Vehicle traffic control systems, such as air traffic control systems, track positions and velocities of vehicles and help manage the trajectories of the vehicles. Vehicle traffic control may be based on radar surveillance, supplemented more recently with cooperative radio surveillance techniques, such as automatic dependent surveillance-broadcast (ADS-B). A vehicle may determine its own position, such as via a Global Navigation Satellite System (GNSS), and periodically broadcast its position via a radio frequency, which may be read by ground stations and other aircraft. Vehicle position data may be provided to a variety of other applications that serve functions such as traffic situational awareness, traffic alert, and collision avoidance, for example.

SUMMARY

This disclosure is directed to systems, devices, and methods for generating vehicle traffic alerts. A device, system, or technique described in this disclosure may select, based on locations of an ownship vehicle and one or more vehicles within a vicinity of the ownship vehicle (referred to herein as "second vehicle(s)"), and output advisory alerts, e.g., to an operator of the ownship vehicle. In some examples, even though a second vehicle is in a relative vicinity of the ownship vehicle, the distance between the second vehicle and the ownship vehicle and/or a direction of travel of the second vehicle and the ownship vehicle may render a potential collision between the ownship vehicle and the second vehicle impossible or extremely unlikely. In such examples, display or output of advisory alerts corresponding to such examples may unnecessarily provide excessive information to operator(s) of the ownship vehicle.

A device, system, or technique described herein may determine locations of the ownship vehicle and second vehicle(s) within a vicinity of the ownship vehicle. An example system may determine, based on the locations, parameters for each vehicle including, but are not limited to, a direction of travel, speed, and/or a projected path of travel for each vehicle. The system may determine based on the parameters whether the ownship vehicle may collide with each second vehicle. The system may output advisory alerts corresponding to a second vehicle based on a determination that there is at least a threshold likelihood of collision.

The devices, systems, or techniques described herein may provide several improvements over other collision alert systems. In some examples, an example system may reduce an amount of alerts outputted to an operator by only outputting alerts corresponding to second vehicle with at least a threshold likelihood of colliding with the ownship vehicle. The reduction in the quantity of outputted alerts may reduce potential reduce the amount of unnecessary information provided to the operator and may increase operator focus on alerts that are relevant to the ownship vehicle. In some examples, the techniques described herein may be performed on existing alert system components without requiring significant modifications to the existing system components. This case of installation may allow existing and/or older ownship vehicles to perform the techniques described herein.

In some examples, the disclosure describes a system comprising: communications circuitry; a user interface (UI); and processing circuitry disposed within an ownship vehicle, the processing circuitry being configured to: receive, via the communications circuitry, one or more first locations of an ownship vehicle; receive, via the communications circuitry, one or more second locations of a second vehicle; determine, based at least in part on the one or more first locations and the one or more second locations, whether the second vehicle satisfies a threshold condition; in response to determining that the second vehicle satisfies the threshold condition, cause the UI to output an alert corresponding to the second vehicle; and in response to determining that the second vehicle does not satisfy the threshold condition, cause the UI to not output the alert.

In some examples, the disclosure describes a method comprising: receiving, by processing circuitry of a system and via communications circuitry of the system, one or more first locations of the ownship vehicle; receiving, by the processing circuitry and via the communications circuitry, one or more second locations of a second vehicle; determining, by the processing circuitry and based at least in part on the one or more first locations and the one or more second locations, whether the second vehicle satisfies a threshold condition; in response to determining that the second vehicle satisfies the threshold condition, causing, by the processing circuitry, a user interface (UI) of the system to output an alert corresponding to the second vehicle; and in response to determining that the second vehicle does not satisfy the threshold condition, causing, by the processing circuitry, the UI to not output the alert.

In some examples, the disclosure describes a computer-readable medium comprising instructions that, when executed by processing circuitry of a system of an ownship vehicle, causes the processing circuitry to receive, via communications circuitry of the system, one or more first locations of the ownship vehicle; receive, via the communications circuitry, one or more second locations of a second vehicle; determine, based at least in part on the one or more first locations and the one or more second locations, whether the second vehicle satisfies a threshold condition; in response to determining that the second vehicle satisfies the threshold condition, cause a user interface (UI) of the system to output an alert corresponding to the second vehicle; and in response to determining that the second vehicle does not satisfy the threshold condition, cause the UI to not output the alert.

The details of one or more examples are set forth in the accompanying drawings and the description below. Other features, objects, and advantages will be apparent from the description and drawings, and from the claims.

DETAILED DESCRIPTION

Various examples described below are generally directed to devices, systems, and methods for generating traffic alerts for potential collisions between an ownship vehicle and one or more second vehicles. A vehicle may transmit surveillance signals to inform systems and other vehicles of the location and course of the vehicle. When a system including a transceiver receives the surveillance signals from the vehicle, the processing circuitry of the system may determine the location and course of the vehicle. Using the determined location and course of the vehicle, the system may predict a future maneuver for the vehicle.

An ownship vehicle may receive (e.g., from one or more second vehicles, from an air traffic controller) locations of second vehicles within a vicinity of the ownship vehicle. Some of the second vehicles may be travelling away from the ownship vehicle, may be travelling parallel to the ownship vehicle, or may be travelling towards the ownship vehicle at a sufficiently low speed of at sufficiently far distance such there is a low probability that the ownship vehicle may collide with the second vehicle in the near future.

In some traffic alert systems, the system may output traffic alerts for each second vehicle within a threshold distance of the ownship vehicle, regardless of a likelihood of collision between the ownship vehicle and the respective second vehicle. Depending on the number of second vehicles within the threshold distance of the ownship vehicle, the system may generate a large number of alerts, many of which correspond to second vehicles that will not collide with or have a low probability of colliding with the ownship vehicle. Such alerts, alternatively referred to herein as "nuisance alerts", may provide excessive and/or unnecessary information to an operator of the ownship vehicle and potentially distract the operator from traffic alerts corresponding to second vehicle with a higher probability of collision with the ownship vehicle.

This disclosure describes devices, systems, and techniques for filtering nuisance alerts from the traffic alerts outputted by a traffic alert system. The traffic alert system may determine, based on locations of the ownship vehicle and one or more second vehicles, a probability of collision between the ownship vehicle and each second vehicle in the near future. The system may output traffic alerts corresponding to second vehicles with at least a threshold probability of collision and not output traffic alerts corresponding second vehicles with less than the threshold probability of collision (i.e., the nuisance alerts). By not outputting the nuisance alerts, the system may reduce the amount of unnecessary information delivered to an operator of the ownship vehicle and reduce a likelihood of distraction of the operator by the unnecessary information by reducing a quantity of the unnecessary information and a frequency at which the operator receives the unnecessary information.

Figure 1:
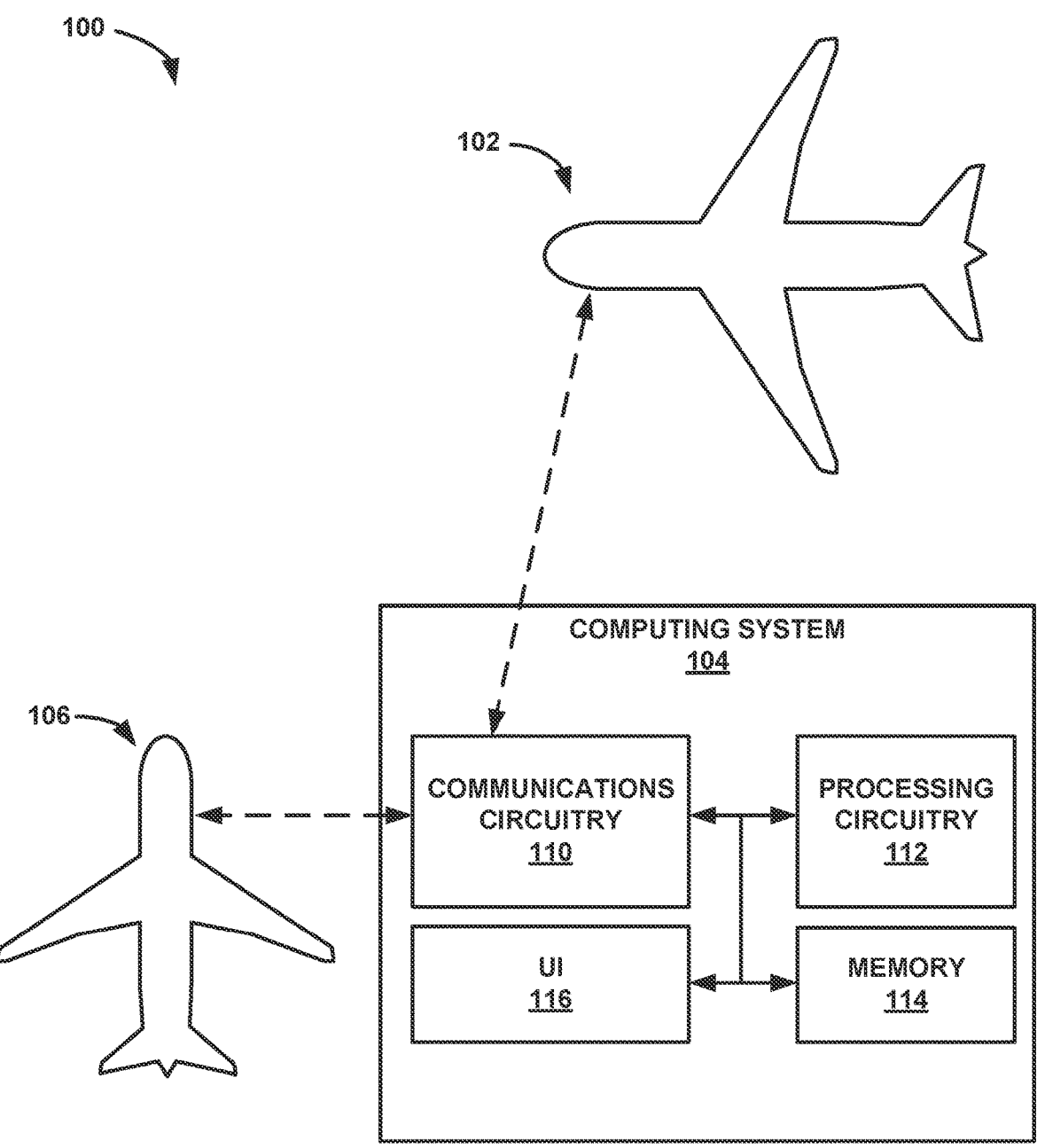
FIG. 1 is a conceptual block diagram illustrating an example traffic alert system.

FIG. 1 is a conceptual block diagram illustrating an example traffic alert system 100 (alternatively referred to herein as "system 100"). System 100 includes a computing system 104 in communication with an ownship vehicle 102 and one or more second vehicles 106 in a vicinity of ownship vehicle 102. Computing system 104 may include computing components including, but are not limited to, communications circuitry 110, processing circuitry 112, user interface (UI) 116, and memory 114. While FIG. 1 illustrate and describes ownship vehicle 102 and second vehicle(s) 106 primarily in terms of aircraft, system 100 may be applied to other types of vehicles. For example, ownship vehicle 102 and/or second vehicle(s) 106 may be an automobile, a train, a ship, an unmanned vehicle, or any other suitable vehicle.

Communications circuitry 110 may receive signals from and/or transmit signals to one or more sources. The one or more sources may include, but are not limited to, ownship vehicle 102, second vehicle(s) 106, a base station, a traffic controller, or the like. In some examples, where computing system 104 is disposed within and/or includes components of ownship vehicle 102, processing circuitry 112 may retrieve the signals directly from components on ownship vehicle 102. Communications circuitry 110 may communicate with the one or more sources via wired or wireless communications. Wireless communications may be performed by one or more wireless transmission protocols including, but are not limited to, Wi-fi, Bluetooth®, radio communications, infrared communication, Wireless Avionics Intra-Communications (WAIC), or any other wireless transmission protocol.

Communications circuitry 110 may receive signals indicative of the locations of ownship vehicle 102 and second vehicle(s) 106. Each vehicle of ownship vehicle 102 and second vehicle(s) 106 may determine respective locations for the vehicle. The locations may be determined via one or more systems including, but are not limited to a Global Navigation Satellite System (GNSS), Global Positioning System (GPS), a Light Detection Ranging (LiDAR) system, or any other system usable by a vehicle to determine a location of the vehicle. The location may be absolute (e.g., relative to a longitude and a latitude) or relative (e.g., relative to another vehicle, relative to a landmark such as a runway). Each vehicle may include one or more systems for determining movement of the vehicle (e.g., altitude, heading, acceleration, velocity, turn rate) such as an inertial navigation system (INS). In some examples, a vehicle may determine movement of the vehicle based on changes in the locations of the vehicle, e.g., as detected by the GNSS. Each vehicle may monitor (e.g., constantly, periodically) the location and movement of the vehicle via the one or more systems.

Each vehicle may output, either automatically or in response to a request from computing system 104, signals corresponding to the location and/or movement of the vehicle. One or more of the vehicles may output the signals as a part of a positioning reporting system or protocol such as Traffic Alert and Collision Avoidance System (TCAS), transponder messaging, Automatic-Dependent Surveillance-Broadcast (ADS-B) system, Automatic Identification System (AIS), another type of position reporting system or protocol, or any combination of the above.

In some examples, such as when ownship vehicle 102 and second vehicle(s) 106 are within or near an airport, communications circuitry 110 may receive signals, e.g., from an air traffic controller, indicating a layout of the airport, e.g., a layout of one or more runways of the airport. In some examples, the layout may be stored in memory 114 and may be retrieved, e.g., by processing circuitry 112.

Processing circuitry 112 may determine, based on the received signals, a probability of collision between ownship vehicle 102 and each second vehicle 106. Processing circuitry 112 may determine a probability of collision within a threshold period of time (e.g., within one minute, within ten minutes). Processing circuitry 112 may determine the probability of collision based on the current locations and/or movement of ownship vehicle 102 and second vehicle(s) 106 and/or based on predicted locations and/or movement of ownship vehicle 102 and second vehicle(s) 106. Processing circuitry 112 may predict future locations and/or movement of vehicles based on trends in changes of prior sensed locations and/or movement of the vehicles, the relative location of each vehicle (e.g., whether the vehicle is on a runway, whether the vehicle is on a taxiway), and/or the intended action(s) of the vehicle (e.g., whether the vehicle is parked, whether the vehicle is taxing to a specific location, whether the vehicle is landing, whether the vehicle is taking off).

Processing circuitry 112 may determine whether there is at least a threshold probability of collision by determining whether each second vehicle 106 (e.g., whether a location or movement of each second vehicle 106) satisfies a threshold condition. In such examples, for each second vehicle 106, processing circuitry 112 may determine that there is at least a threshold probability of collision based on a determination that the corresponding threshold condition has been satisfied. Threshold conditions may include, but are not limited to, whether a path of travel for ownship vehicle 102 intersects with the path of travel of second vehicle 106, a minimum distance between ownship vehicle 102 and second vehicle 106, a threshold time between when ownship vehicle 102 passes a particular location and when second vehicle 106 passes the same location, a threshold time to collision between ownship vehicle 102 and second vehicle 106, or whether one of ownship vehicle 102 or second vehicle 106 enters a zone at least a threshold distance from a runway or from the other of ownship vehicle 102 or second vehicle.

Processing circuitry 112 may select and/or apply different threshold conditions based on the availability, or lack thereof, of specific information (e.g., location and/or movement information of second vehicle 106). In some examples, processing circuitry 112 may select and/or apply different threshold conditions based on planned activity, or lack thereof, of ownship vehicle 102 (e.g., whether ownship vehicle 102 is parked, whether ownship vehicle 102 is taxing to a specific location, whether ownship vehicle 102 is taking off, whether ownship vehicle 102 is landing). Memory 114 may store threshold conditions that correspond to a threshold probability (e.g., a 50% probability, a 90% probability). Memory 114 may store, for each threshold condition, different threshold values corresponding to different threshold probabilities.

Processing circuitry 112 may store information corresponding to each second vehicle 106 in memory 114. The information for each second vehicle 106 may include, but are not limited to, the type of second vehicle 106, a designation of second vehicle 106 (e.g., a flight number, a flight designator) locations of second vehicle 106, directions of travel of second vehicle 106, speed of second vehicle 106, types of action performed by second vehicle 106 (e.g., taxiing, taking-off, landing), path of travel of second vehicle 106, probability of collision between ownship vehicle 102 and second vehicle 106, a predicted time until collision between ownship vehicle 102 and second vehicle 106, or other relevant information.

Memory 114 may store program instructions which are executable by processing circuitry 112. When executed by processing circuitry 112, such program instructions may cause processing circuitry 112 to perform the functionalities attributed to it herein. The program instructions may be embodied in software and/or firmware. Memory 114 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Processing circuitry 112 may generate traffic alerts for each second vehicle 106 that has at least a threshold probability of colliding with ownship vehicle 102 (e.g., each second vehicle 106 that satisfies a threshold condition). The traffic alert may include, but are not limited to, a type of second vehicle 106, a designation of second vehicle 106, a current location of second vehicle 106, a predicted location of second vehicle 106, a speed of second vehicle 106, a direction of travel of second vehicle 106, or a path of travel of second vehicle 106. Processing circuitry 112 may store each traffic alert within memory 114. Processing circuitry 112 may transmit the traffic alert via communications circuitry 110 to one or more of ownship vehicle 102, second vehicle(s) 106 (e.g., second vehicle 106 corresponding to the traffic alert), a base station, air traffic control, or other appropriate parties.

Processing circuitry 112 may cause UI 116 to output the traffic alert, e.g., to operators of ownship vehicle 102. UI 116 may include one or more output devices and/or one or more input devices. Each output device may be configured to output a traffic alert in the form of visual signals (e.g., in the form of text and/or images), audio signals, or tactile signals. Output devices may include, but are not limited to, displays or microphones. Input devices may receive user input and transmit the user input to processing circuitry 112. In some examples, in response to user input received via UI 116, processing circuitry 112 causes UI 116 to terminate (e.g., temporarily or permanently) output of one or more traffic alerts. Processing circuitry 112 may only output traffic alerts corresponding to second vehicle(s) 106 with at least a threshold probability of colliding with ownship vehicle 102, e.g., to reduce a quantity of nuisance alerts outputted by UI 116.

Processing circuitry 112 may continue to monitor the location and/or movement of ownship vehicle 102 and/or second vehicle(s) 106. Processing circuitry 112 may continuously or periodically (e.g., once every five seconds, once every ten seconds) location and/or movement of ownship vehicle 102 based on additional signals received by communications circuitry 110 and/or retrieved by processing circuitry 112. For example, communications circuitry 110 may receive signals corresponding to updated locations of ownship vehicle 102 and/or second vehicle(s) 106 and processing circuitry 112 may determine updated probabilities of collision between ownship vehicle 102 and each second vehicle 106 based on the updated locations. Processing circuitry 112 may cause UI 116 to terminate output of one or more traffic alerts and/or output one or more new traffic alerts based on changes in the probabilities of collision between ownship vehicle 102 and second vehicle(s) 106.

Computing system 104 may simultaneously and continuously monitor locations of a plurality of vehicles (e.g., tens, hundreds) within a vicinity of ownship vehicle 102. Computing system 104 may monitor the locations and/or movement of each vehicle and adjust outputted traffic alerts based on changes to the locations and/or movement of one or more monitored vehicles. Computing system 104 may predict, based on the monitored locations and/or movement of each vehicle, future locations and/or movement for each vehicle. Computing system 104 may adjust the outputted traffic alerts based on changes to the predicted future locations and/or movement of one or more vehicles.

In some examples, computing system 104 outputs, via UI 116, a recommended course to an operator of ownship vehicle 102 in response to one or more traffic alerts for second vehicle(s) 106 that satisfy threshold condition(s). The recommended course may cause ownship vehicle 102 to avoid collision with one or more second vehicle(s) 106. In some examples, the recommended course may cause one or more second vehicle(s) 106 to no longer satisfy threshold condition(s), thereby reducing a number of potential collision targets for ownship vehicle 102.

The functions attributed to the components of computing system 104, as described above, may be performed by one or more computing devices, one or more computing systems, and/or one or more cloud computing environments. The components of computing system 104 may be entirely disposed within ownship vehicle 102, partially disposed within ownship vehicle 102, and/or disposed outside of ownship vehicle 102 (e.g., within a base station).

Figure 2:
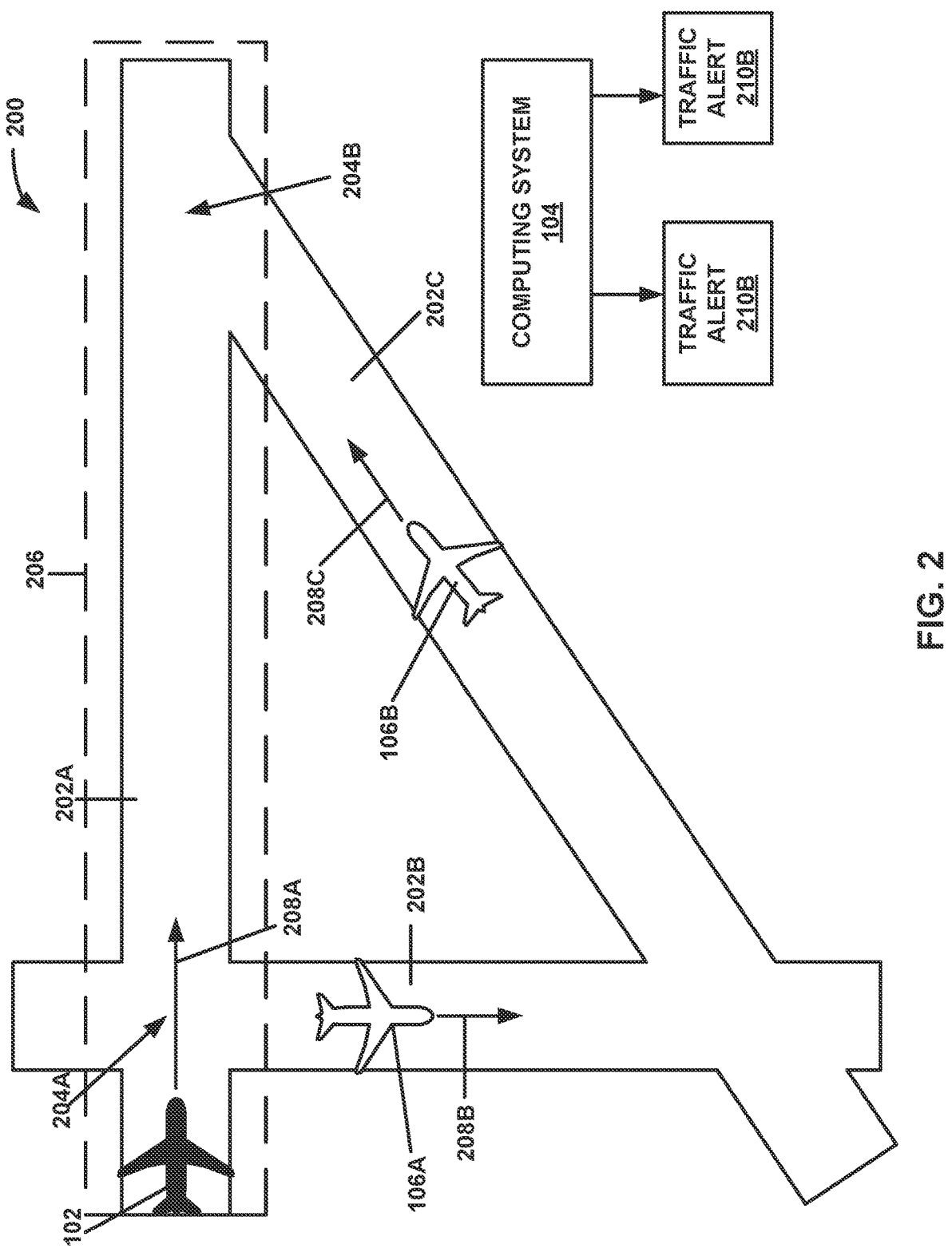
FIG. 2 is a conceptual block diagram illustrating the example traffic alert system of FIG. 1 outputting traffic alerts in response to an example potential collision scenario.

FIG. 2 is a conceptual block diagram illustrating the example traffic alert system 100 of FIG. 1 outputting traffic alerts in response to an example potential collision scenario 200. Computing system 104 of system 100 may monitor locations and movement of ownship vehicle 102 and one or more second vehicles 106A, 106B (collectively referred to as "second vehicles 106"). While FIG. 2 illustrates and is described primarily with reference to two second vehicles 106, other examples of scenario 200 may include one second vehicle 106 or three or more vehicles 106. Computing system 104 may determine whether one or more of second vehicles 106 satisfy a threshold condition. The threshold condition may correspond to a threshold probability of collision between ownship vehicle 102 and each of second vehicles 106. Computing system 104 may cause UI 116 of computing system 104 to output a traffic alert corresponding to the one or more second vehicles 106 based on a determination that the threshold condition has been satisfied. While FIG. 2 is described primarily with reference to vehicles navigating along one or more runways 202A-C (collectively referred to as "runways 202"), it is appreciated that in other examples of scenario 200, vehicles with navigate along other types of paths and/or roadways.

Ownship vehicle 102 may advance along a first runway 202A in a first direction 208A. Each of runways 202 may intersect with one or more other runways 202 at one or more points of intersection 204A, 204B (collectively referred to herein as "points of intersection 204"). While FIG. 2 illustrates three runways 202 and two points of intersection 204, other examples may include two runways 202 or four or more runways 202, and/or one point of intersection 204 or three or more points of intersection 204.

As ownship vehicle 102 advances along first runways 202A, ownship vehicle 102 may define a zone 206. Each edge of zone 206 may be a threshold width away from ownship vehicle 102. The width of zone 206 may be defined based on location of ownship vehicle 102, or may be set at a fixed distance from one or more edges of first runway 202A. For example, the width may be based on the minimal operational runway separation limit for first runway 202A, e.g., as provided by an air traffic control system or base station. In some examples, the width may be defined by a regulatory body (e.g., International Civil Aviation Organization (ICAO)). In such examples, the threshold distance may be 75 meters (m).

Second vehicle 106A may advance along a second runway 202B in a direction 208B. Computing system 104 may compare direction of travel 208A against direction of travel 208B. Computing system 104 may determine, based on directions of travel 208A, 208B, that one or more of ownship vehicle 102 or second vehicle(s) 106 (e.g., second vehicle 106A as illustrated in FIG. 2) is advancing away from a point of intersection between directions of travel 208A, 208B (e.g., point of intersection 204A). Computing system 104 may determine, based on the determination that one or more of ownship vehicle 102 or second vehicle 106A is advancing away from point of intersection 204A, that the probability that ownship vehicle 102 collides with second vehicle 106A is zero. In some examples, computing system 104 may determine that second vehicle 106A does not satisfy a threshold condition based on a determination that second vehicle 106A is not heading towards ownship vehicle 102 at point of intersection 204A. Computing system 104 may, based on a determination that second vehicle 106A does not satisfy the threshold condition and/or a threshold probability of collision, label a traffic alert corresponding to second vehicle 106A as a nuisance alert and cause UI 116 to not output the traffic alert.

As system 100 continues to monitor second vehicle 106A, computing system 104 may determine that second vehicle 106A satisfies a threshold condition and/or has at least a threshold probability of collision with ownship vehicle 102. For example, second vehicle 106A may turn from runway 202B onto runway 202C and advance towards point of intersection 204B. In such examples, computing system 104 may cause UI 116 to output the traffic alert corresponding to second vehicle 106A in response to satisfaction of the threshold condition and/or a determination of at least the threshold probability of collision with ownship vehicle 102.

In the example illustrated in FIG. 2, second vehicle 106B advances along runways 202C in direction 208C and towards point of intersection 204B between runways 202A and 202C. Computing system 104 may determine, based on signals received from ownship vehicle 102 and second vehicle 106B, that the paths of travel of both vehicles overlap at point of intersection 204B. This determination may satisfy a threshold condition that both ownship vehicle 102 and second vehicle 106B travel towards a common point of intersection (e.g., point of intersection 204B).

Computing system 104 may determine, based on the received signals (e.g., based on a current location and current speed and/or acceleration) of both ownship vehicle 102 and second vehicle 106B, an estimated time for each vehicle to arrive at point of intersection 204B. Computing system 104 may determine, based on the received signals, a distance, speed, and/or time to point of intersection 204B for one vehicle of ownship vehicle 102 or second vehicle 106B when the other vehicle arrives at point of intersection 204B. Computing system 104 may determine whether the distance to point of intersection 204B and/or the time to point of intersection 204B satisfies one or more threshold conditions (e.g., a threshold distance, a threshold time). The threshold distance may represent a minimum distance between ownship vehicle 102 and second vehicle 106B when one of ownship vehicle 102 or second vehicle 106B is at point of intersection 204B. The threshold distance may be at least equal to width of zone 206. In some examples, the threshold distance may be determined based on the threshold time and a relative speed between ownship vehicle 102 or second vehicle 106B. In some examples, when one or more vehicles of ownship vehicle 102 or second vehicle 106B is currently stationary or travelling at a low speed (e.g., a speed below 20 kilometers per hour), computing system 104 may determine the threshold distance based on an expected operation speed of the one or more vehicles. Computing system 104 may determine the expected operation speed based on intended destinations of the one or more vehicles or the intended action performed by the one or more vehicles (e.g., taking off, taxiing). The threshold time may be at least about one minute (e.g., at least two minutes, at least five minutes). In some examples, the threshold time may be at least about 45 seconds.

Computing system 104 may, in response to determining that the time and/or distance to point of intersection 204B satisfies one or more corresponding threshold conditions, output a traffic alert For second vehicle 106B. Computing system 104 may, in response to determining that the time and/or distance to point of intersection 204B do not satisfy any threshold conditions, label the traffic alert for second vehicle 106B as a nuisance and cause UI 116 not to output the traffic alert. If second vehicle 106B and/or ownship vehicle 102 subsequently changes movement (e.g., speed, acceleration) that would cause the time and/or distance to point of separation 204B to satisfy or no longer satisfy a threshold condition, computing system 104 may output or not output the traffic alert corresponding to second vehicle 106B, respectively.

While FIG. 2 illustrates both second vehicles 106 as being on the ground, in other examples of scenario 200, one or more of second vehicles 106 and/or ownship vehicle 102 may be on the ground, in the air, transitioning from on the ground to in the air (e.g., taking off), or transitioning from in the air to on the ground (e.g., landing). Computing system 104 may apply different threshold conditions to second vehicles 106 depending on the current position of second vehicle 106 relative to the ground and/or the current position of ownship vehicle 102. For example, computing system 104 may compare a predicted time to collision with different threshold times based on a determination that second vehicle 106 is in the air compared to when second vehicle 106 is on the ground. In another examples, computing system 104 may compare a predicted time to collision with different threshold times based on a determination that ownship vehicle 102 is in the air compared to when ownship vehicle 102 is on the ground.

Figure 3:
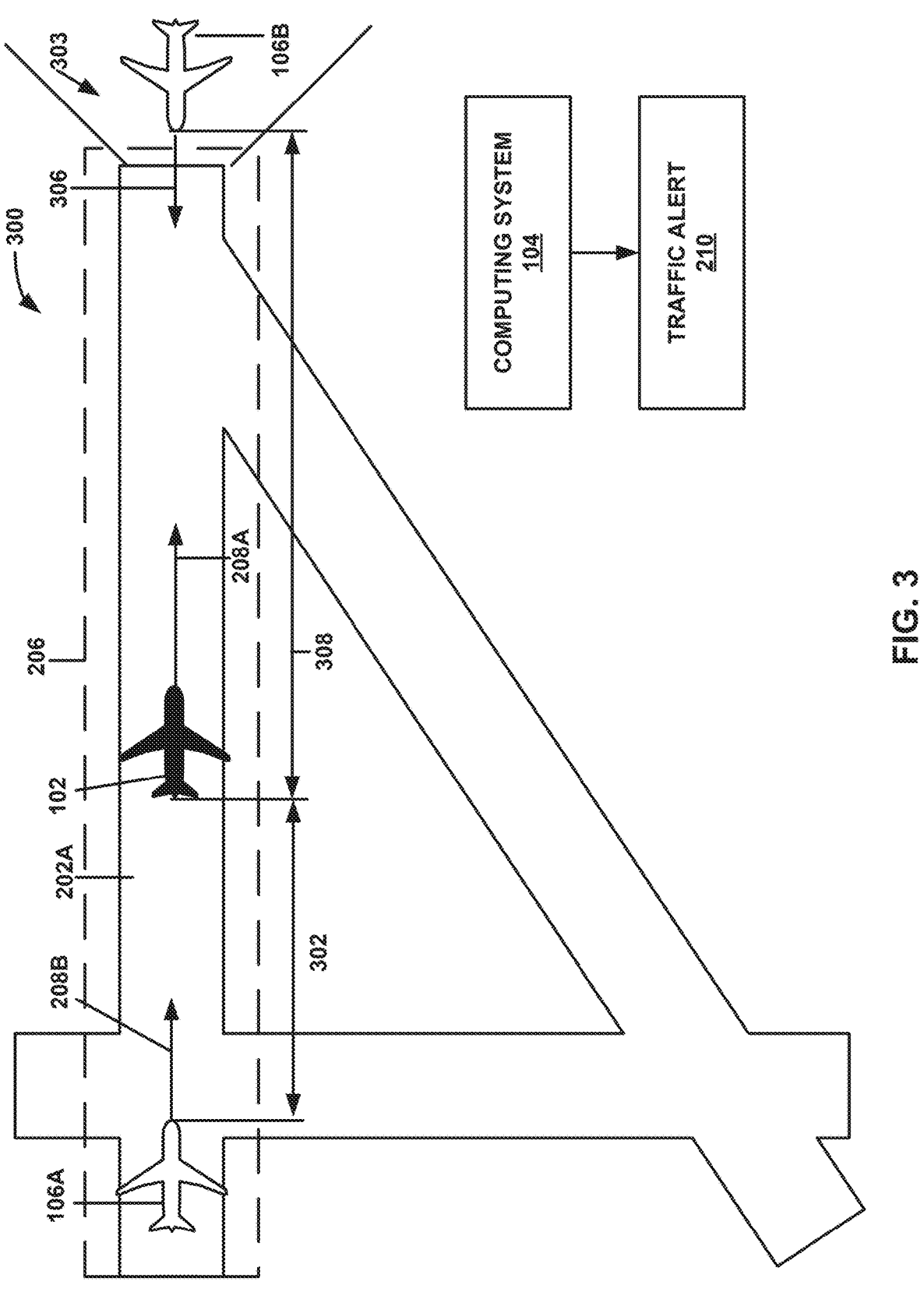
FIG. 3 is a conceptual diagram illustrating the example traffic alert system of FIG. 1 outputting traffic alerts in response to another example potential collision scenario.

FIG. 3 is a conceptual diagram illustrating the example traffic alert system 100 of FIG. 1 outputting traffic alerts in response to another example potential collision scenario 300. As illustrated in FIG. 3, scenario 300 may include one or more second vehicles 106 advancing along a same runway 202 as ownship vehicle 102. Second vehicle(s) 106 may be advancing towards, away, or in a same direction as ownship vehicle 102. In some examples, one or more second vehicles 106 may be airborne (e.g., within an airspace 303) and heading towards or away from the same runway 202.

In some examples, second vehicle 106A may be travelling away from ownship vehicle 102 along a same runway 202A (e.g., in a direction of travel 208B opposite to direction of travel 208A). In such examples, computing system 104 may determine that second vehicle 106A does not satisfy a threshold condition based on a determination that the path of travel of second vehicle 106A does not intersect or otherwise interfere with the path of travel of ownship vehicle 102. Based on the determination that second vehicle 106A does not satisfy a threshold condition, computing system 104 may label the traffic alert for second vehicle 106A as a nuisance alert and cause UI 116 to not output the traffic alert.

In some examples, as illustrated in FIG. 2, second vehicle 106A is travelling in a same direction as ownship vehicle 102 along runway 202 (e.g., direction 208B is the same as direction 208A). Computing system 104 may determine, based on locations and movements of ownship vehicle 102 and of second vehicle 106A, a distance 302 between ownship vehicle 102 and second vehicle 106A. Computing system 104 may monitor distance 302 to determine second vehicle 106A satisfies a threshold condition (e.g., whether distance 302 is less than or equal to the threshold distance). In some examples, computing system 104 compares speeds of ownship vehicle 102 and second vehicle 106A to determine whether second vehicle 106A satisfies a threshold condition (e.g., whether the speed of second vehicle 106A exceeds the speed of ownship vehicle 102).

Computing system 104 may cause UI 116 to output a traffic alert corresponding to second vehicle 106A based on a determination that second vehicle 106A satisfies a threshold condition. Computing system 104 may label the traffic alert as a nuisance alert and/or may cause UI 116 to not output the traffic alert based on a determination that second vehicle 106A does not satisfy a threshold condition. Computing system 104 may continue to monitor second vehicle 106A and may cause UI 116 to output or to not output the traffic alert based on whether changes in movement and/or location of second vehicle 106A causes second vehicle 106A to satisfy a threshold condition.

In some examples, as illustrated in FIG. 2, second vehicle 106B is traveling along or towards runway 202A in an opposite direction as ownship vehicle 102 (e.g., direction of travel 306 is opposite to direction of travel 208A). Second vehicle 106B may be on the ground or in airspace 303 (e.g., as illustrated in FIG. 3). Ownship vehicle 102 may be on the ground or in airspace 303. Airspace 303 may correspond to runway 202A and may define an entry or exit corridor onto runway 202A for a vehicle. Airspace 303 may extend away from runway 202A at one or more ends of runway 202A.

Computing system 104 may determine a distance 308 between ownship vehicle 102 and second vehicle 106B based on locations and movements of ownship vehicle 102 and second vehicle 106B. Computing system 104 may continuously adjust and monitor distance 308 based on movements of one or more of ownship vehicle 102 or second vehicle 106B. Computing system 104 may compare distance 308 to a threshold condition (e.g., a threshold distance, a threshold time) to determine whether second vehicle 106B satisfies a threshold condition. The threshold distance for when ownship vehicle 102 faces an oncoming second vehicle 106B may be different from another threshold distance for a second vehicle 106A advancing behind ownship vehicle 102. The threshold distance may be determined based on a threshold separation time (e.g., 45 seconds, one minute), and a relative speed between ownship vehicle 102 and second vehicle 106B.

Computing system 104 may cause UI 116 to output a traffic alert corresponding to second vehicle 106B based on a determination that second vehicle 106B satisfies a threshold condition (e.g., that distance 308 is less than or equal to a threshold distance). Computing system 104 may label the traffic alert as a nuisance alert and/or cause UI 116 to not output the traffic alert based on a determination that second vehicle 106B does not satisfy the threshold condition (e.g., that distance 308 is greater than the threshold distance). In some examples, computing system 104 causes UI 116 to output the traffic alert based on a determination that second vehicle 106B is heading towards and travelling in an opposite direction to ownship vehicle 102 along runway 202 (e.g., regardless of distance 308).

Figure 4:
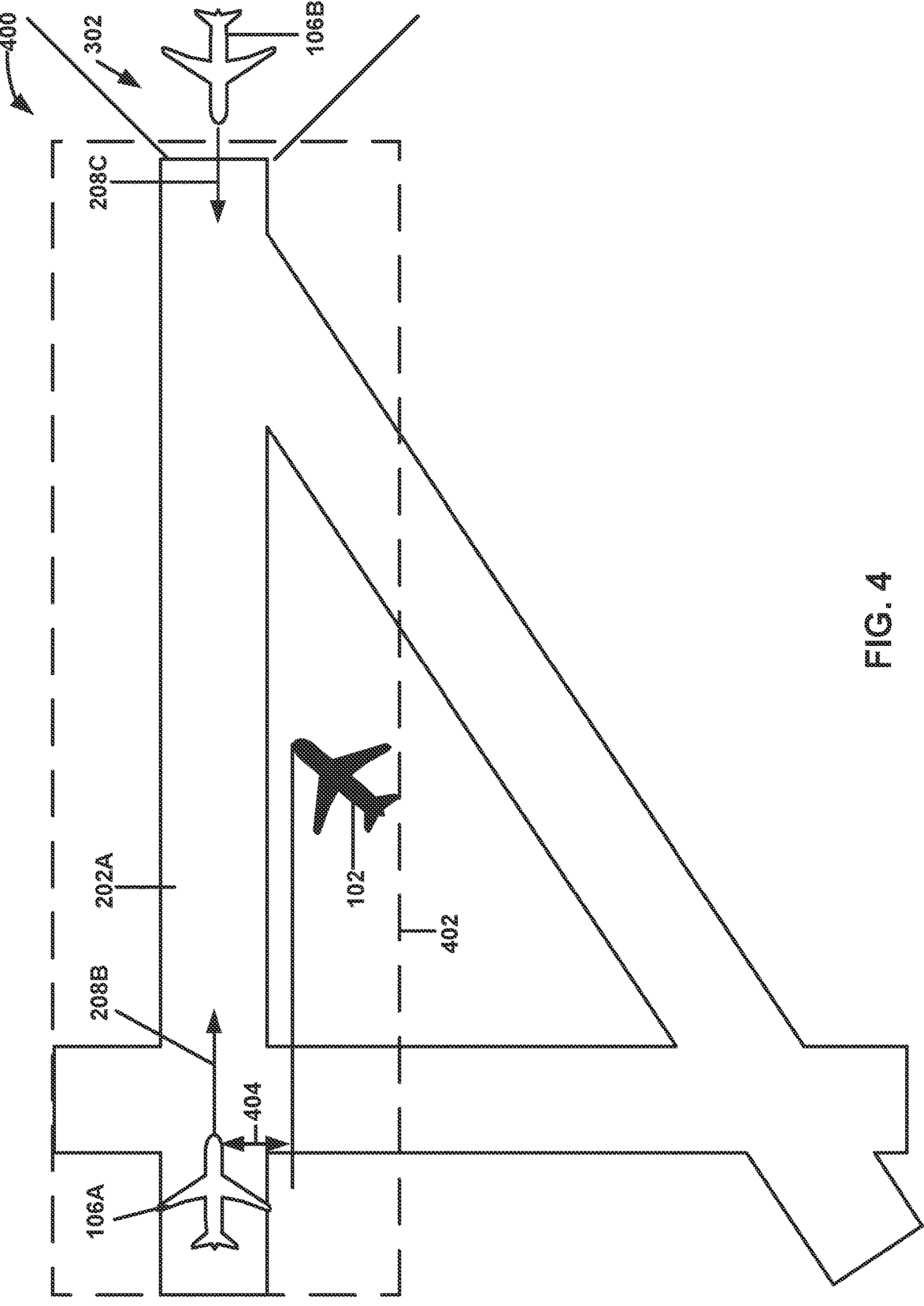
FIG. 4 is a conceptual diagram illustrating the example traffic alert system of FIG. 1 outputting traffic alerts in response to another example potential collision scenario.

FIG. 4 is a conceptual diagram illustrating the example traffic alert system 100 of FIG. 1 outputting traffic alerts in response to another example potential collision scenario 400. In some examples, as illustrated in FIG. 4, ownship vehicle 102 may not be on runway 202A but may nonetheless be at a risk of collision with one or more second vehicles 106 advancing along runway 202A. For example, ownship vehicle 102 may be stationary besides runway 202A, stationary on a taxiway connected to runway 202A, or in any other scenarios where ownship vehicle 102 is near but not on runway 202A.

Computing system 104 may assign a zone 402 around runway 202A. The boundaries of zone 402 may be separated from the edges of runway 202A by at least the minimum operational runway separation limit. Computing system 104 may determine, based on the locations of ownship vehicle 102 and second vehicles 106 (e.g., second vehicle 106A, second vehicle 106B), whether ownship vehicle 102 is at least partially within zone 402. Based on a determination that ownship vehicle 102 is not within zone 402, computing system 104 may determine that each second vehicle 106 travelling along runway 202A do not satisfy a threshold condition and label traffic alerts for each such second vehicle 106 as nuisance alerts and/or may not output the traffic alerts. In some examples, a second vehicle 106 along runway 202A may be heading away from ownship vehicle 102. In such examples, computing system 104 may determine that second vehicle 106 does not satisfy a threshold condition.

In some examples, where ownship vehicle 102 is at least partially within zone 402, computing system 104 may determine a separation distance 404 between each second vehicle 106 on runway 202A and ownship vehicle 102. Computing system 104 may determine that a second vehicle 106 satisfies a threshold condition by determining that distance 404 satisfies a threshold distance (e.g., is less than or equal to the threshold distance). The threshold distance may be equal to or different from a minimum operational separation limit.

In some examples, computing system 104 may determine whether second vehicle 106 satisfies threshold distance based at least in part on a distance between second vehicle 106 and ownship vehicle 102 along a major axis of runway 202A. Computing system 104 may determine that second vehicle 106 satisfies a threshold distance based on a determination that second vehicle 106 and ownship vehicle 102 are separated by less than or equal to a minimum distance. Computing system 104 may determine that second vehicle 106 does not satisfy the threshold distance based on a determination that second vehicle 106 and ownship vehicle 102 are separated by more than a maximum distance. The maximum distance may correspond to a minimum time to collision between second vehicle 106 and ownship vehicle 102 that is greater than or equal to the threshold time to collision. Computing system 104 may determine the maximum distance based on one or more of a current distance between second vehicle 106 and ownship vehicle 102, a velocity of second vehicle 106, or a rate of acceleration of second vehicle 106.

Computing system 104 may determine whether second vehicle 106 satisfies a threshold condition when a current distance between ownship vehicle 102 and second vehicle 106 is between the minimum distance and the maximum distance. In such examples, computing system 104 may determine the likelihood of collision and/or the time to collision based on the locations of second vehicle 106 and ownship vehicle 102, the velocity of second vehicle 106, and/or the rate of acceleration of second vehicle 106. Computing system 104 may determine that second vehicle 106 satisfies a threshold condition when second vehicle 106 and ownship vehicle 106 are separated by a distance between the minimum and maximum distances. In such examples, computing system 104 may determine that second vehicle 106 satisfies a threshold condition based on a determination that a likelihood of collision and/or a time to collision satisfies a threshold likelihood of collision and/or a threshold time to collision, respectively.

In some examples, second vehicle 106 may be stationary on runway 202A. In such examples, computing system 104 may determine that a threshold condition is or is not satisfies based on a determination that second vehicle 106 and ownship vehicle 102 are separated by a distance less than or equal to a minimum distance or greater than equal to a maximum distance, respectively. When second vehicle 106 is stationary, the maximum distance may correspond to a minimum time to collision greater than or equal to the threshold time to collision if second vehicle 106 begins to move at the instant time. When the second vehicle 106 and ownship vehicle 102 are separated by a distance between the minimum distance and the maximum distance, computing system 104 may determine that second vehicle 106 satisfies a threshold condition based on a determination, based at least in part on the distance, that there is at least a threshold likelihood of collision and/or less than a threshold time to collision if second vehicle 106 beings to move at the instant time.

Figure 5:
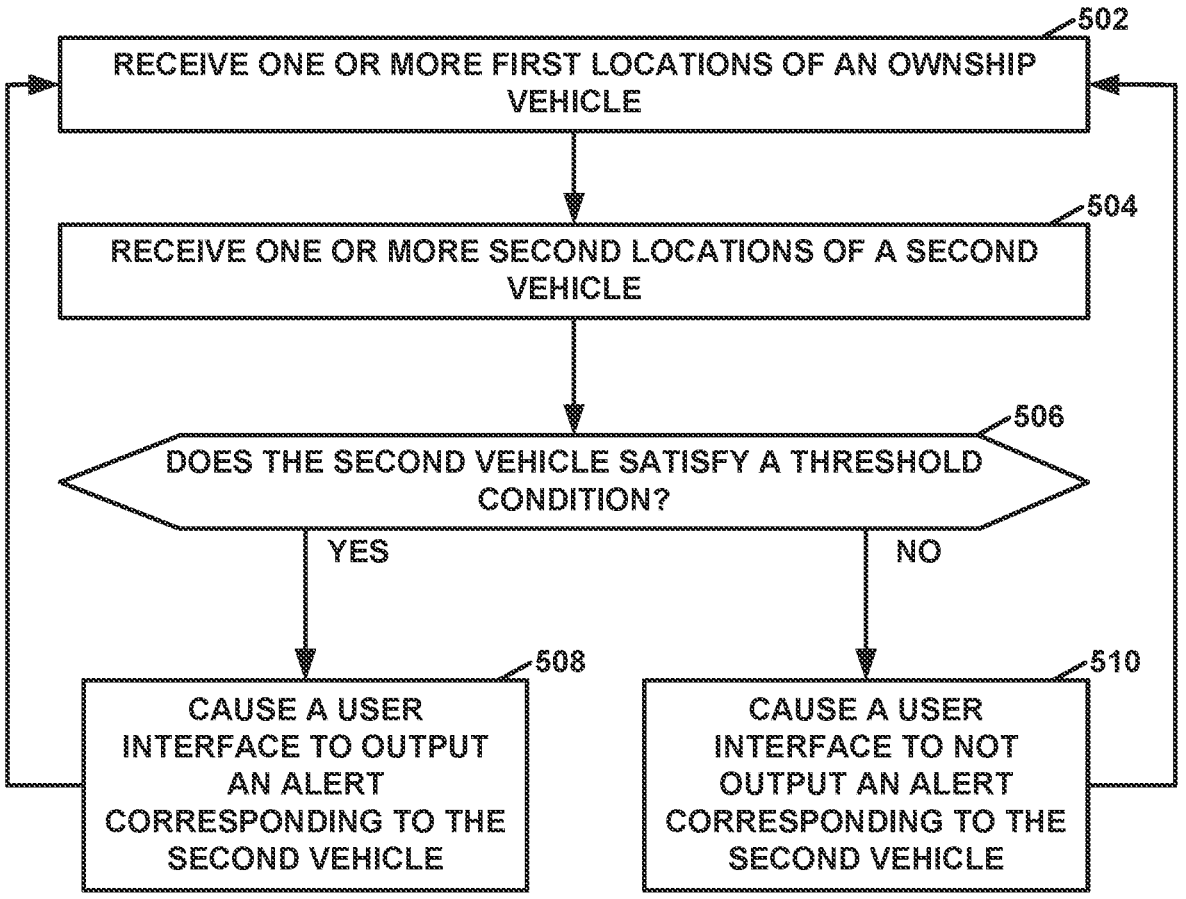
FIG. 5 is a flow chart illustrating an example process for outputting alerts via an example traffic alert system.

FIG. 5 is a flow chart illustrating an example process for outputting alerts via an example traffic alert system 100. While FIG. 5 is described primarily with respect to FIGS. 1-4, the process described herein may be applied by any example computing device, computing system, and/or cloud computing environment and/or to any example scenario described in this disclosure.

System 100 may receive one or more first locations of ownship vehicle 102 (502). System 100 may receive the one or more first locations from ownship vehicle 102 via communications circuitry 110 of computing system 104. Communications circuitry 110 may receive the one or more first locations via wired and/or wireless communications protocols. The first location(s) of ownship vehicle 102 may be determined via one or more position monitoring system disposed within ownship vehicle 102 including, but are not limited to, GNSS, GPS, or LiDAR. In some examples, system 100 may receive the one or more first locations from an ADS-B, TCAS, AIS, or other monitoring system disposed on or within ownship vehicle 102. The first location(s) may be absolute (e.g., in terms of latitude and longitude) or may be relative to one or more reference points and/or reference objects (e.g., one or more runways, a base station). System 100 may continuously receive signals indicating current locations of ownship vehicle 102. In some examples, system 100 receives signals indicating movement (e.g., speed, acceleration, path of travel, direction of travel) of ownship vehicle 102 in addition to first locations of ownship vehicle 102.

System 100 may receive one or more second locations of second vehicle 106 (504). The second locations of second vehicle 106 may be determined via a position monitoring system disposed within second vehicle 106 including, but are not limited to, GNSS, GPS, or LiDAR. System 100 may receive the one or more second locations from an ADS-B, TCAS, AIS, or other monitoring system disposed within second vehicle 106. Second locations may be absolute or may be relative to one or more reference points and/or reference objects. The reference points and/or reference objects for ownship vehicle 102 and for second vehicle 106 may be the same or may be different. While the example process illustrated in FIG. 5 is described primarily with reference to one second vehicle 106. System 100 may receive corresponding locations from two or more second vehicles 106.

System 100 may determine whether second vehicle 106 satisfies a threshold condition (506). Threshold conditions may correspond to whether there is a threshold probability of collision between ownship vehicle 102 and second vehicle 106 (e.g., within a threshold period of time). The threshold period of time may be up to about one minute. Threshold conditions may include, but are not limited to, a determination that ownship vehicle 102 and second vehicle 106 are heading towards each other, a threshold distance between ownship vehicle 102 and second vehicle 106, a threshold time to collision between ownship vehicle 102 and second vehicle 106, a threshold speed of ownship vehicle 102 and/or second vehicle 106, a determination that the paths of travel of ownship vehicle 102 and second vehicle 106 intersect, a determination that one or more of ownship vehicle 102 and/or second vehicle 106 are within a zone relative to a runway (e.g., zone 206, zone 402), or any other threshold conditions described herein.

System 100 may determine whether second vehicle 106 satisfies the threshold condition based at least in part on the received one or more first locations and the one or more second locations. In some examples, system 100 determines whether a threshold condition is satisfied based at least in part on movement of ownship vehicle 102 and/or movement of second vehicle 106, the first locations and the second locations, alone or in any combination. In some examples, system 100 may require satisfaction of two or more threshold conditions by second vehicle 106. For example, system 100 may require that a determination that ownship vehicle 102 and second vehicle 106 have intersecting or interfering paths of travel and that there is less than or equal to a threshold time to collision between ownship vehicle 102 and second vehicle 106.

In response to a determination that second vehicle 106 satisfies a threshold condition ("YES" branch of 506), system 100 may cause a user interface (UI) to output an alert corresponding to second vehicle 106 (508). System 100 may determine, based on satisfaction of a threshold condition, that there is at least a threshold probability of collision between ownship vehicle 102 and second vehicle 106. System 100 may generate an alert (e.g., a traffic alert) in response to the determination. The alert may include information indicating a type, a location, a speed, an acceleration, a direction of travel, an altitude, a path of travel and/or an intended destination of second vehicle 106. System 100 may cause a UI (e.g., UI 116) to output at least a portion of the alert, e.g., to an operator of ownship vehicle 102. UI 116 may output the alert in the form of visual output, audio output, and/or tactile output. System 100 may store alerts, e.g., in memory 114. System 100 may retrieve and cause UI 116 to output one or more stored alerts in response to user request, e.g., received by communications circuitry 110 or UI 116, to display the one or more stored alerts.

In response to a determination that second vehicle 106 does not satisfy a threshold condition ("NO" branch of 506), system 100 may cause a UI to not output an alert corresponding to second vehicle 106 (510). System 100 may determine, based on the failure to satisfy a threshold condition, that there is less than the threshold probability of collision between ownship vehicle 102 and second vehicle 106. System 100 may label any alerts corresponding to second vehicles 106 with less than the threshold probability of collision with ownship vehicle 102 as nuisance alerts. System 100 may not output any alerts labeled as nuisance alerts and/or alerts for second vehicles 106 with less than a threshold probability of collision with ownship vehicle 102. System 100 may store alerts corresponding to all second vehicles 106 in memory 114, e.g., regardless of the threshold probability of collision with ownship vehicle 102 and/or whether second vehicle 106 satisfies a threshold condition.

System 100 may continue to receive locations for ownship vehicle 102 and second vehicle 106 and determine whether second vehicle 106 satisfies a threshold condition in accordance with steps 502-510 described above. System 100 may continuously or periodically (e.g., every second, every five seconds) monitor whether second vehicle 106 satisfies a threshold condition. Based on changes in locations and/or movement of ownship vehicle 102 and/or second vehicle 106, system 100 may determine whether second vehicle 106 satisfies a threshold condition and cause UI 116 to output or to not output alerts based on changes in satisfaction of threshold condition by second vehicle 106.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

Elements of the computing system may be programmed with various forms of software. The computing system may be implemented at least in part as, or include, one or more executable applications, application modules, libraries, classes, methods, objects, routines, subroutines, firmware, and/or embedded code, for example. Elements of the computing system as in any of the examples herein may be implemented as a device, a system, an apparatus, and may embody or implement a method of receiving surveillance signals and predicting future vehicle maneuvers.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

The following examples may illustrate one or more of the techniques of this disclosure.

Example 1: a system comprising: communications circuitry; a user interface (UI); and processing circuitry disposed within an ownship vehicle, the processing circuitry being configured to: receive, via the communications circuitry, one or more first locations of an ownship vehicle; receive, via the communications circuitry, one or more second locations of a second vehicle; determine, based at least in part on the one or more first locations and the one or more second locations, whether the second vehicle satisfies a threshold condition; in response to determining that the second vehicle satisfies the threshold condition, cause the UI to output an alert corresponding to the second vehicle; and in response to determining that the second vehicle does not satisfy the threshold condition, cause the UI to not output the alert.

Example 2: the system of example 1, wherein the processing circuitry is configured to: determine, based on the one or more first locations of the ownship vehicle, a first path of travel for the ownship vehicle; and determine, based on the one or more second locations of the second vehicle, a second path of travel for the second vehicle, and wherein to determine whether the second vehicle satisfies the threshold condition, the processing circuitry is configured to: determine, based at least in part on the first path of travel and the second path of travel, whether the second vehicle satisfies the threshold condition.

Example 3: the system of any of examples 1 and 2, wherein the one or more first locations and the one or second locations are relative to one or more runways.

Example 4: the system of example 3, wherein the one or more runways comprises a first runway and a second runway, wherein the first runway intersects with the second runway at a point of intersection, and wherein the processing circuitry is configured to determine whether the second vehicle satisfies the threshold condition when one of the ownship vehicle or the second vehicle is at the point of intersection.

Example 5: the system of example 4, wherein the processing circuitry is configured to: determine, based at least in part on the one or more first locations, whether the ownship vehicle is travelling along the first runway towards the point of intersection; determine, based at least in part on the one or more second locations whether the second vehicle is travelling along the second runway towards the point of intersection; and in response to determining that the one or more of the ownship vehicle or the second vehicle is travelling away from the point of intersection, cause the UI to not output the alert corresponding to the second vehicle.

Example 6: the system of any of examples 4 and 5, wherein the processing circuitry is configured to: determine, based on the one or more second locations, a direction of travel and a ground speed of the second vehicle; compare the ground speed of the second vehicle against a threshold ground speed, wherein the threshold condition comprises the threshold ground speed; in response to a determination that the ground speed of the second vehicle is greater than or equal to the threshold ground speed and that the second vehicle is travelling towards the point of intersection, cause the UI to output the alert; and in response to a determination that the ground speed is less than the threshold ground speed, cause the UI to not output the alert.

Example 7: the system of any of examples 3-6, wherein the processing circuitry is configured to: determine, based on the one or more second locations, a direction of travel and a ground speed of the second vehicle; determine a distance between the ownship vehicle and the second vehicle when one of the ownship vehicle or the second vehicle is located at the point of intersection; compare the distance to a threshold distance, wherein the threshold condition comprises the threshold distance; in response to a determination that the distance is less than or equal to the threshold distance, cause the UI to output the alert; and in response to a determination that the distance is greater than the threshold distance, cause the UI to not output the alert.

Example 8: the system of any of examples 1-7, wherein to determine whether the second vehicle satisfies the threshold condition, the processing circuitry is configured to: determine, based on the one or more first locations and the one or more second locations, that the ownship vehicle and the second vehicle are travelling in a same direction along a same runway; determine, based on the one or more first locations and the one or more second locations, a distance between the ownship vehicle and the second vehicle along the same runway; compare the distance against a threshold distance, wherein the threshold condition comprises the threshold distance; in response to a determination that the distance is less than or equal to the threshold distance, cause the UI to not output the alert; and in response to a determination that the distance is greater than the threshold distance, cause the UI to output the alert.

Example 9: the system of any of examples 1-8, wherein the processing circuitry is configured to: determine, based on the one or more first locations and the one or more second locations, that one or more of the ownship vehicle or the second vehicle are travelling in an opposite direction along a same runway relative to the other of the ownship vehicle or the second vehicle; and in response to a determination that the one or more of the ownship vehicle or the second vehicle are travelling in the opposite direction along the same runway relative to the other of the ownship vehicle or the second vehicle, cause the UI to not output the alert.

Example 10: the system of any of examples 1-9, wherein the second vehicle is airborne, and wherein the processing circuitry is configured to: determine, based at least in part on the one or more first locations and the one or more second locations, an amount of time until the second vehicle will collide with the ownship vehicle; compare the time against a threshold time, wherein the threshold condition comprises the threshold time; and in response to a determination that the time is greater than or equal to the threshold time, cause the UI to not output the alert.

Example 11: the system of any of examples 1-10, wherein the ownship vehicle is airborne, and wherein the processing circuitry is configured to: determine, based at least in part on the one or more first locations and the one or more second locations, an amount of time until the second vehicle will collide with the ownship vehicle; compare the time against a threshold time, wherein the threshold condition comprises the threshold time; and in response to a determination that the time is greater than or equal to the threshold time, cause the UI to not output the alert.

Example 12: the system of any of examples 10 and 11, wherein the threshold time corresponds to a minimum operational runway separation limit.

Example 13: the system of any of examples 1-12, wherein the ownship vehicle is stationary and within a minimum distance of a runway, wherein the second vehicle is traveling along or landing on the runway, and wherein the threshold condition comprises the minimum distance.

Example 14: the system of any of examples 1-13, wherein the processing circuitry is configured to: receive, via the communications circuitry one or more third locations of the ownship vehicle and one or more fourth locations of the second vehicle; determine, based at least in part on the one or more third locations and the one or more fourth locations whether the second vehicle satisfies the threshold condition; in response to a determination that the second vehicle does not satisfy the threshold condition, cause the UI to not output the alert; and in response to a determination that the second vehicle does satisfy the threshold condition, cause the UI to output the alert.

Example 15: the system of any of examples 1-14, wherein the communications circuitry is configured to retrieve the one or more second locations from an Automatic Dependent Surveillance-Broadcast (ADS-B) system of the second vehicle.

Example 16: the system of any of examples 1-15, wherein the alert comprises information corresponding to the second vehicle, the information comprising one or more of: a direction of travel of the second vehicle a current location of the second vehicle, a speed of the second vehicle, or a distance between the ownship vehicle and the second vehicle.

Example 17: a method comprising: receiving, by processing circuitry of a system and via communications circuitry of the system, one or more first locations of the ownship vehicle; receiving, by the processing circuitry and via the communications circuitry, one or more second locations of a second vehicle; determining, by the processing circuitry and based at least in part on the one or more first locations and the one or more second locations, whether the second vehicle satisfies a threshold condition; in response to determining that the second vehicle satisfies the threshold condition, causing, by the processing circuitry, a user interface (UI) of the system to output an alert corresponding to the second vehicle; and in response to determining that the second vehicle does not satisfy the threshold condition, causing, by the processing circuitry, the UI to not output the alert.

Example 18: the method of example 17, further comprising: determining, by the processing circuitry and based on the one or more first locations of the ownship vehicle, a first path of travel for the ownship vehicle; and determining, by the processing circuitry and based on the one or more second locations of the second vehicle, a second path of travel for the second vehicle, and wherein determining whether the second vehicle satisfies the threshold condition comprises: determining, by the processing circuitry and based at least in part on the one or more first locations and the one or more second locations, whether the second vehicle satisfies the threshold condition.

Example 19: the method of any of examples 17 and 18, wherein the one or more first locations and the one or more second locations are relative to one or more runways.

Example 20: the method of example 17, wherein the one or more runways comprises a first runway and a second runway, wherein the first runway intersects with the second runway at a point of intersection, and wherein determining whether the second vehicle satisfies the threshold condition comprises determining, by the processing circuitry, whether the second vehicle satisfies the threshold condition when one of the ownship vehicle or the second vehicle is at the point of intersection.

Example 21: the method of example 20, wherein the method further comprises: determining, by the processing circuitry and based at least in part on the one or more first locations, whether the ownship vehicle is travelling along the first runway towards the point of intersection; determining, by the processing circuitry and based at least in part on the one or more second locations, whether the second vehicle is travelling along the second runway towards the point of intersection; and in response to determining that one or more of the ownship vehicle or the second vehicle is travelling away from the point of intersection, cause the UI to not output the alert corresponding to the second vehicle.

Example 22: the method of any of examples 20 and 21, further comprising: determining, by the processing circuitry and based on the one or more second locations, a direction of travel a ground speed of the second vehicle; comparing, by the processing circuitry, the ground speed of the second vehicle against a threshold ground speed, wherein the threshold condition comprises the threshold ground speed; in response to a determination that the ground speed is greater than or equal to the threshold ground speed and that the direction of travel is towards the point of intersection, causing, by the processing circuitry, the UI to output the alert; and in response to a determination that the ground speed is less than the threshold ground speed, causing the UI to not output the alert.

Example 23: the method of any of examples 20-22, further comprising: determining, by the processing circuitry and based on the one or more second locations, a direction of travel and a ground speed of the second vehicle; determining, by the processing circuitry, a distance between the ownship vehicle and the second vehicle when one of the ownship vehicle or the second vehicle is located at the point of intersection; comparing, by the processing circuitry, the distance to a threshold distance, wherein the threshold condition comprises the threshold distance; in response to a determination that the distance is less than or equal to the threshold distance, causing, by the processing circuitry, the UI to output the alert; and in response to a determination that the distance is greater than the threshold distance, causing, by the processing circuitry, the UI to not output the alert.

Example 24: the method of any of examples 17-23, wherein determining whether the second vehicle satisfies the threshold condition comprises: determining, by the processing circuitry and based on the one or more first locations and the one or more second locations, that the ownship vehicle and the second vehicle are travelling in a same direction along a same runway; determining, by the processing circuitry and based on the one or more first locations and the one or more second locations, a distance between the ownship vehicle and the second vehicle along the same runway; comparing, by the processing circuitry, the distance against a threshold distance, wherein the threshold condition comprises the threshold distance; in response to a determination that the distance is less than or equal to the threshold distance, causing, by the processing circuitry, the UI to not output the alert; and in response to a determination that the distance is greater than the threshold distance, causing, by the processing circuitry, the UI to output the alert.

Example 25: the method of any of examples 17-24, wherein determining whether the second vehicle satisfies the threshold condition comprises: determining, by the processing circuitry and based on the one or more first locations and the one or more second locations, that one or more of the ownship vehicle or the second vehicle are travelling in an opposite direction along a same runway relative to the other of the ownship vehicle or the second vehicle; and in response to a determination that the one or more of the ownship vehicle or the second vehicle are travelling in the opposite direction relative to the other of the ownship vehicle or the second vehicle, causing, by the processing circuitry, the UI to not output the alert.

Example 26: the method of any of examples 17-25, wherein the second vehicle is airborne, and wherein determining whether the second vehicle satisfies the threshold condition comprises: determining, by the processing circuitry and based at least in part on the one or more first locations and the one or more second locations, an amount of time until the second vehicle will collide with the ownship vehicle; comparing, by the processing circuitry, the time against a threshold time, wherein the threshold condition comprises the threshold time; and in response to a determination that the time is greater than or equal to the threshold time, causing, by the processing circuitry, the UI to not output the alert.

Example 27: the method of any of examples 17-26, wherein the ownship vehicle is airborne, and wherein determining whether the second vehicle satisfies the threshold condition comprises: determining, by the processing circuitry and based at least in part on the one or more first locations and the one or more second locations, an amount of time until the second vehicle will collide with the ownship vehicle; comparing, by the processing circuitry, the amount of time against a threshold amount of time, wherein the threshold condition comprises the threshold time; and in response to a determination that the amount of time is greater than or equal to the threshold amount of time, causing, by the processing circuitry, the UI to not output the alert.

Example 28: the method of any of examples 26 and 27, wherein the threshold amount of time corresponds to a minimum operational runway separation limit.

Example 29: the method of any of examples 17-28, wherein the ownship vehicle is stationary and within a minimum distance of a runway, wherein the second vehicle is traveling along or landing on the runway, wherein the threshold condition comprises the minimum distance, and wherein determining that the second vehicle satisfies the threshold condition comprises determine that a distance between the ownship vehicle and the second vehicle is less than or equal to the minimum distance.

Example 30: the method of any of examples 17-29, further comprising: receiving, by the processing circuitry and via the communications circuitry, one or more third locations of the ownship vehicle and one or more fourth locations of the second vehicle; determining, by the processing circuitry and based at in part on the one or more third locations and the one or more fourth locations, whether the second vehicle satisfies the threshold condition; in response to a determination that the second vehicle does not satisfy the threshold condition, causing, by the processing circuitry, the UI to not output the alert; and in response to a determination that the second vehicle does satisfy the threshold condition, causing, by the processing circuitry, the UI to output the alert.

Example 31: the method of any of examples 17-30, wherein the communication circuitry is configured to communicate with an Automatic Dependent Surveillance-Broadcast (ADS-B) system of the second vehicle.

Example 32: a computer-readable medium comprising instructions that, when executed by processing circuitry of a system of an ownship vehicle, causes the processing circuitry to perform the method of any of examples 17-31.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray Disc™, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various illustrative aspects of the disclosure are described above. These and other aspects are within the scope of the following claims.

What is claimed is:

1. A system comprising:
communications circuitry;
a user interface (UI); and
processing circuitry disposed within an ownship aircraft,
wherein the processing circuitry is configured to, for each respective vehicle of a plurality of vehicles:
    receive, via the communications circuitry while the ownship aircraft is active on one or more runways or taxiways, one or more first locations of the ownship aircraft;
    receive, via the communications circuitry, one or more second locations of the respective vehicle;
    determine, based at least in part on the one or more first locations and the one or more second locations, that a first path of travel of the ownship aircraft intersects with a second path of travel of the respective vehicle; and
    in response to determining that the first path of travel intersects with the second path of travel, generate a collision alert for the respective vehicle, and
wherein the processing circuitry is configured to, for each collision alert for the respective vehicle of the plurality of vehicles:
    continuously adjust one or more of the first path of travel based on the one or more first locations of the ownship aircraft or the second path of travel based on the one or more second locations of the respective vehicle;
    continuously determining a probability of collision between the ownship aircraft and the respective vehicle based at least in part on the first path of travel and the second path of travel, wherein to determine the probability of collision, the processing circuitry is configured to:
        determine, based on the first path of travel and the second path of travel, that the ownship aircraft and the respective vehicle are traveling in a same direction; and
        compare a ground speed of the respective vehicle against an operational speed of the ownship aircraft;
    continuously compare the probability of collision against a threshold probability;
    when the probability of collision is greater than or equal to the threshold probability, cause the UI to output the collision alert, wherein the processing circuitry is configured to determine that the probability of collision is greater than or equal to the threshold probability when the ground speed of the respective vehicle is greater than or equal to the operational speed of the ownship aircraft; and
    when the probability of collision is less than the threshold probability, cause the UI to not output the collision alert, wherein the processing circuitry is configured to determine that the probability of collision is less than or equal to the threshold probability when the ground speed of the respective vehicle is less than or equal to the operational speed of the ownship aircraft.

2. The system of claim 1,
wherein the one or more first locations and the one or second locations are relative to the one or more runways,
wherein the one or more runways or taxiways comprises a first runway and a second runway, wherein the first runway intersects with the second runway at a point of intersection, and
wherein the processing circuitry is configured to determine, for each collision alert for the each respective vehicle of the plurality of vehicles, the probability of collision between the ownship aircraft and the respective vehicle when one of the ownship aircraft or the respective vehicle is at the point of intersection.

3. The system of claim 2,
wherein the processing circuitry is configured to, for each collision alert for each respective vehicle of the plurality of vehicles:
    determine, based at least in part on the one or more first locations, whether the ownship aircraft is travelling along the first runway towards the point of intersection;
    determine, based at least in part on the one or more second locations, whether the respective vehicle is travelling along the second runway towards the point of intersection; and
    in response to determining that the one or more of the ownship aircraft or the respective vehicle is travelling away from the point of intersection, determine that the probability of collision between the ownship aircraft and the respective vehicle is less than the threshold probability.

4. The system of claim 2, wherein the processing circuitry is configured to, for each collision alert for each respective vehicle of the plurality of vehicles:
    determine, based on the one or more second locations, a distance between the ownship aircraft and the respective vehicle when one of the ownship aircraft or the respective vehicle is located at the point of intersection;
    compare the distance to a threshold distance;
    in response to a determination that the distance is less than or equal to the threshold distance, determine that the probability of collision between the ownship aircraft and the respective vehicle is greater than or equal to the threshold probability; and
    in response to a determination that the distance is greater than the threshold distance, determine that the probability of collision between the ownship aircraft and the respective vehicle is less than the threshold probability.

5. The system of claim 1, wherein the processing circuitry is configured to, for each collision alert for each respective vehicle of the plurality of vehicles:
    determine, based on the one or more first locations and the one or more second locations, that the ownship aircraft and the respective vehicle are travelling in a same direction along a same runway or taxiway of the one or more runways or taxiways;
    determine, based on the one or more first locations and the one or more second locations, a distance between the ownship aircraft and the respective vehicle along the same runway or taxiway;
    compare the distance against a threshold distance;
    in response to a determination that the distance is less than or equal to the threshold distance, determine that the probability of collision between the ownship aircraft and the respective vehicle is greater than or equal to the threshold probability; and; and in response to a determination that the distance is greater than the threshold distance, determine that the probability of collision between the ownship aircraft and the respective vehicle is less than the threshold probability.

6. The system of claim 1, wherein the processing circuitry is configured to, for each collision alert for each respective vehicle of the plurality of vehicles:

determine, based on the one or more first locations and the one or more second locations, that the ownship aircraft and the respective vehicle are travelling in opposite directions along a same runway or taxiway of the one or more runways or taxiways; and in response to a determination that the one or more of the ownship aircraft or the respective vehicle are travelling in opposite directions along the same runway or taxiway, determine that the probability of collision between the ownship aircraft and the respective vehicle is less than the threshold probability.

7. The system of claim 1, wherein the processing circuitry is configured to, for each collision alert for each respective vehicle of the plurality of vehicles:

determine that the respective vehicle is traveling along or landing on a first runway of the one or more runways or taxiways;

determine that the ownship aircraft is stationary;

determine a minimum distance between the ownship aircraft and the first runway; and compare the minimum distance between the ownship aircraft and the first runway against a threshold distance;

in response to a determination that the minimum distance is less than or equal to the threshold distance, determine that the probability of collision between the ownship aircraft and the respective vehicle is greater than or equal to the threshold probability; and in response to a determination that the minimum distance is greater than the threshold distance, determine that the probability of collision between the ownship aircraft and the respective vehicle is less than the threshold probability.

8. The system of claim 1, wherein the communications circuitry is configured to retrieve the one or more second locations from an Automatic Dependent Surveillance-Broadcast (ADS-B) system of each respective vehicle of the plurality of vehicles.

9. The system of claim 1, wherein for each respective vehicle of the plurality of vehicles, the respective collision alert comprises information corresponding to the respective vehicle, the information comprising one or more of: a direction of travel of the respective vehicle, a current location of the respective vehicle, a speed of the respective vehicle, or a distance between the ownship aircraft and the respective vehicle.

10. The system of claim 1, wherein the processing circuitry is configured to:

continuously monitor the one or more first locations for the ownship aircraft; and for each respective vehicle of the plurality of vehicles:

continuously monitor the one or more second locations of the respective vehicle;

continuously adjust, based on changes to at least one of the one or more first locations or the one or more second locations, the probability of collision between the ownship aircraft and the respective vehicle;

continuously compare an adjusted probability of collision against the threshold probability;

when the adjusted probability of collision is greater than or equal to the threshold probability, cause the UI to output the collision alert; and when the adjusted probability of collision is less than the threshold probability, cause the UI to not output the collision alert.

11. A method comprising:

receiving, by processing circuitry of a system and via communications circuitry of the system, one or more first locations of an ownship aircraft while the ownship aircraft is active on one or more runways or taxiways;

receiving, by the processing circuitry and via the communications circuitry, one or more second locations of each vehicle of a plurality of vehicles;

for each respective vehicle of the plurality of vehicles:

determining, by the processing circuitry and based at least in part on the one or more first locations, that a first path of travel of the ownship aircraft intersects with a second path of travel of the respective vehicle;

in response to determining that the first path of travel intersects with the second path of travel, generating, by the processing circuitry, a collision alert for the respective vehicle; and for each collision alert for the respective vehicle of the plurality of vehicles:

continuously adjusting one or more of the first path of travel based on the one or more first locations of the ownship aircraft or the second path of travel based on the one or more second locations of the respective vehicle;

continuously determining, by the processing circuitry, a probability of collision between the ownship aircraft and the respective vehicle based at least in part on the first path of travel and the second path of travel, wherein determining the probability of collision between the ownship aircraft and the respective vehicle comprises:

determining, by the processing circuitry and based on the first and second paths of travel, that the ownship aircraft and the respective vehicle are traveling in a same direction; and comparing, by the processing circuitry, a ground speed of the respective vehicle against an operational speed of the ownship aircraft;

continuously comparing, by the processing circuitry, the probability of collision against a threshold probability, wherein the processing circuitry determines that the probability of collision is greater than or equal to the threshold probability when the ground speed of the respective vehicle is greater than or equal to the operational speed of the ownship aircraft, and wherein the processing circuitry determines that the probability of collision is less than or equal to the threshold probability when the ground speed of the respective vehicle is less than or equal to the operational speed of the ownship aircraft;

when the probability of collision is greater than or equal to the threshold probability, causing, by the processing circuitry, a user interface (UI) of the system to output the collision alert; and when the probability of collision is less than the threshold probability, causing, by the processing circuitry, the UI to not output the collision alert.

12. The method of claim 11, wherein the one or more first locations and the one or more second locations are relative to the one or more runways or taxiways, wherein the one or more runways or taxiways comprises a first runway and a second runway, wherein the first runway intersects with the second runway at a point of intersection, and wherein for each collision alert for the respective vehicle of the plurality of vehicles, determining, by the processing circuitry, the probability of collision between the ownship aircraft and the respective vehicle comprises determining, by the processing circuitry, the probability of collision between the ownship aircraft and the respective vehicle when one of the ownship aircraft or the respective vehicle is at the point of intersection.

13. The method of claim 12, wherein the method further comprises, for each collision alert for each respective vehicle of the plurality of vehicles:

determining, by the processing circuitry and based at least in part on the one or more first locations, whether the ownship aircraft is travelling along the first runway towards the point of intersection;

determining, by the processing circuitry and based at least in part on the one or more second locations, whether the respective vehicle is travelling along the second runway towards the point of intersection; and in response to determining that one or more of the ownship aircraft or the respective vehicle is travelling away from the point of intersection, determining, by the processing circuitry, that the probability of collision between the ownship aircraft and the respective vehicle is less than the threshold probability.

14. The method of claim 12, further comprising, for each collision alert for each respective vehicle of the plurality of vehicles:

determining, by the processing circuitry and based on the one or more second locations, a distance between the ownship aircraft and the respective vehicle when one of the ownship aircraft or the respective vehicle is located at the point of intersection;

comparing, by the processing circuitry, the distance to a threshold distance;

in response to a determination that the distance is less than or equal to the threshold distance, determining, by the processing circuitry, that the probability of collision between the ownship aircraft and the respective vehicle is greater than or equal to the threshold probability; and in response to a determination that the distance is greater than the threshold distance, determining, by the processing circuitry, than the probability of collision between the ownship aircraft and the respective vehicle is less than the threshold probability.

15. The method of claim 11, further comprising, for each collision alert for each respective vehicle of the plurality of vehicles:

determining, by the processing circuitry and based on the one or more first locations and the one or more second locations, that the ownship aircraft and the respective vehicle are travelling in a same direction along a same runway or taxiway of the one or more runways or taxiways;

determining, by the processing circuitry and based on the one or more first locations and the one or more second locations, a distance between the ownship aircraft and the respective vehicle along the same runway or taxiway;

comparing, by the processing circuitry, the distance against a threshold distance;

in response to a determination that the distance is less than or equal to the threshold distance, determining, by the processing circuitry, that the probability of collision between the ownship aircraft and the respective vehicle is greater than or equal to the threshold probability; and in response to a determination that the distance is greater than the threshold distance, determining, by the processing circuitry, that the probability of collision between the ownship aircraft and the respective vehicle is less than the threshold probability.

16. The method of claim 11, further comprising:

continuously monitor the one or more first locations for the ownship aircraft; and for each respective vehicle of the plurality of vehicles:

continuously monitoring, by the processing circuitry the one or more second locations of the respective vehicle;

continuously adjusting, by the processing circuitry and based on changes to at least one of the one or more first locations or the one or more second locations, the probability of collision between the ownship aircraft and the respective vehicle;

continuously comparing, by the processing circuitry, an adjusted probability of collision against the threshold probability;

when the adjusted probability of collision is greater than or equal to the threshold probability, causing, by the processing circuitry, the UI to output the collision alert; and when the adjusted probability of collision is less than the threshold probability, causing, by the processing circuitry, the UI to not output the collision alert.

17. A non-transitory computer-readable medium comprising instructions that, when executed by processing circuitry of a system of an ownship aircraft when the ownship aircraft is active on one or more runways or taxiways, causes the processing circuitry to:

receive, from communications circuitry of the system, one or more first locations of the ownship aircraft;

receive, via the communications circuitry, one or more second locations of each vehicle of a plurality of vehicles;

for each respective vehicle of the plurality of vehicles:

determine, based at least in part on the one or more first locations and the one or more second locations, that a first path of travel of the ownship aircraft intersects with a second path of travel of the respective vehicle;

in response to a determination that the first path of travel intersects with the second path of travel, generate a collision alert for the respective vehicle; and for each collision alert for the respective vehicle of the plurality of vehicles:

continuously adjust one or more of the first path of travel based on the one or more first locations of the ownship aircraft or the second path of travel based on the one or more second locations of the respective vehicle;

continuously determine a probability of collision between the ownship aircraft and the respective vehicle based at least in part on the first path of travel and the second path of travel, wherein to determine the probability of collision, the instructions causes the processing circuitry to:

determine, based on the first path of travel and the second path of travel, that the ownship aircraft and the respective vehicle are traveling in a same direction; and compare a ground speed of the respective vehicle against an operational speed of the ownship aircraft;

continuously compare the probability of collision against a threshold probability;

wherein the instructions causes the processing circuitry to;

determine that the probability of collision is greater than or equal to the threshold probability when the ground speed of the respective vehicle is greater than or equal to the operational speed of the ownship aircraft; and determine that the probability of collision is less than or equal to the threshold probability when the ground speed of the respective vehicle is less than or equal to the operational speed of the ownship aircraft;

when the probability of collision is greater than or equal to the threshold probability, cause a user interface (UI) of the system to output the collision alert; and when the probability of collision is less than the threshold probability, cause the UI to not output the collision alert.

18. The non-transitory computer-readable medium of claim 17, comprising instructions that, when executed, causes the processing circuitry to:

continuously monitor the one or more first locations for the ownship aircraft; and for each respective vehicle of the plurality of vehicles:

continuously monitor the one or more second locations of the respective vehicle;

continuously adjust, based on changes to at least one of the one or more first locations or the one or more second locations, the probability of collision between the ownship aircraft and the respective vehicle;

continuously compare an adjusted probability of collision against the threshold probability;

when the adjusted probability of collision is greater than or equal to the threshold probability, cause the UI to output the collision alert; and when the adjusted probability of collision is less than the threshold probability, cause the UI to not output the collision alert.

\* \* \* \* \*